G. A. SHAKESPEAR.
APPARATUS FOR THE DETECTION AND MEASUREMENT OF GASES.
APPLICATION FILED OCT. 15, 1918.

1,304,208.

Patented May 20, 1919.

Inventor
G.A.Shakespear.
By H.R.Kerslake
Atty

UNITED STATES PATENT OFFICE.

GILBERT ARDEN SHAKESPEAR, OF BIRMINGHAM, ENGLAND.

APPARATUS FOR THE DETECTION AND MEASUREMENT OF GASES.

1,304,208.  Specification of Letters Patent. Patented May 20, 1919.

Application filed October 15, 1918. Serial No. 258,229.

*To all whom it may concern:*

Be it known that I, GILBERT ARDEN SHAKESPEAR, D. Sc., residing at The University, Birmingham, England, a subject of the King of Great Britain and Ireland, have invented certain new and useful Improvements Relating to Apparatus for the Detection and Measurement of Gases, of which the following is a specification.

This invention has for its object to provide improved apparatus for the detection and measurement of a known constituent in a given gaseous mixture, the apparatus being of the type in which the rate of loss of heat of a body exposed to the gaseous mixture is employed as the detecting and measuring agency. This invention consists in the employment of a Wheatstone bridge system comprising a pair of electrically heated wires, one of which is surrounded by the gas to be tested while the other is surrounded either by air or by any other gas which can serve as a standard for comparison, the deflection of a galvanometer or the adjustment necessary to produce a state of balance in the system being employed to give the required measurement.

In the accompanying diagrams, Figure 1 illustrates the arrangement of a gas detecting or measuring instrument constructed in accordance with this invention.

Ordinarily I form a pair of similar cavities $a$ $a'$ in a metal block $b$ (Fig. 1) and in each arrange one of a pair of similar detecting wires $c$. At one end each wire is electrically connected to the block and at the other end is insulated. One of the cavities ($a$) is hermetically sealed, but the other ($a'$) by means of small perforations $d$ in the block is open to the external atmosphere. Each wire is arranged in series with another resistance $e$ $e'$ and the whole of the elements are connected as shown in the manner of the well known Wheatstone bridge system, a galvanometer $f$ being provided across one pair of junctions and a battery $g$ across another pair. The metal block $b$ is adapted in any convenient manner to be inserted in a position where it is freely accessible to the gas to be tested. On closing the circuit both wires in the block are heated. The amount of heating permitted may be varied, but ordinarily a few degrees in excess of the normal temperature of the gas is sufficient. If the two gases surrounding the wires are similar no deflection will occur on the galvanometer, but if one of them differs from the other due to the presence of another gaseous constituent the balance is disturbed. In all cases the average temperature of the two gases surrounding the wires is substantially the same. The instrument is calibrated so that either the galvanometer deflection, or the variation of resistance external to the wires required to restore the balance gives the measure of the proportion of the said constituent in the mixture.

Figure 3:
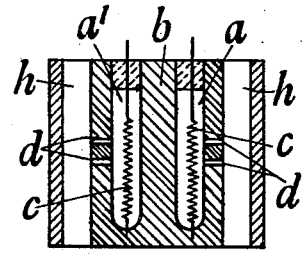
Fig. 3 shows a modified form of block containing the detecting wires.

The invention may be applied for a variety of like purposes. Thus, it may be utilized for the detection of leakage in the neighborhood of industrial gas holders, or for laboratory analyses of gases of which the constituents are known, or for checking the uniformity of gaseous mixtures used as anesthetics. Also, the invention is not limited to the constructional details herein described as these may be varied in a number of ways to meet different requirements. For example, a pair of pipes $h$ (Fig. 3) may provide communication through perforations $d$ with each cavity $a$ $a'$ and a slow stream of gas may be passed through both, one having a standard composition and the other containing the gas to be detected.

Figure 1:
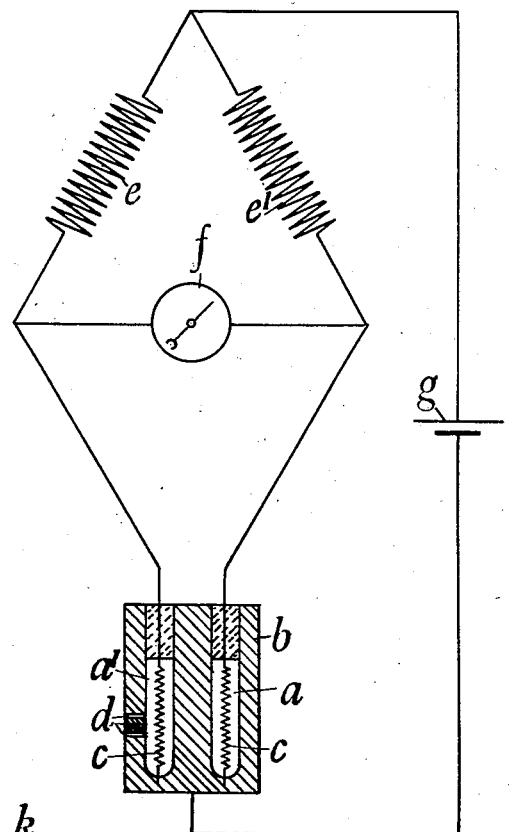
Figure 2:
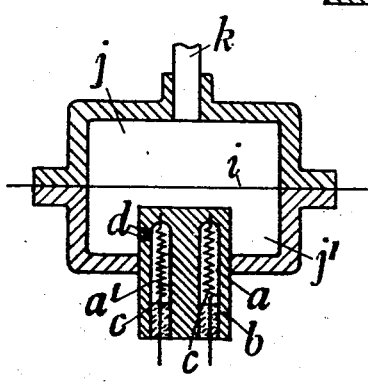
Fig. 2 shows an application of the invention to detecting leakage of gases through fabrics.

For testing the porosity or permeability of balloon or other fabrics the device shown in Fig. 2 is employed. A portion of the fabric $i$ is gripped between a pair of chambers $j$ $j'$. To the chamber $j$ gas (e. g. hydrogen) is admitted by a pipe $k$, and to the other chamber $j'$ a block $b$ fitted with detecting wires and constructed as shown in Fig. 1 is secured. One of the cavities is open by way of lateral perforations to the chamber $j'$ and any leakage of gas through the fabric into the chamber is detected by the instrument, the deflection of the galvanometer indicating the amount of leakage.

Having thus described my invention what I claim as new and desire to secure by Letters Patent is:—

1. In apparatus for the detection and measurement of gases, the combination comprising a pair of detecting wires, a pair of resistances and a galvanometer forming a Wheatstone bridge system, and a metal block having a pair of cavities each containing a detecting wire, said block being provided with perforations between one of the cavities and the exterior of the block, substantially as described.

2. In apparatus for the detection and measurement of gases, the combination comprising a pair of detecting wires, a pair of resistances and a galvanometer forming a Wheatstone bridge system, a metal block having a pair of cavities, and pipes whereby different gases can be admitted to the cavities, substantially as described.

In testimony whereof I have signed my name to this specification.

GILBERT ARDEN SHAKESPEAR.